Dec. 13, 1949     D. BELCHER ET AL     2,491,027
APPARATUS FOR PREPARING PRINTING PLATES
Original Filed Oct. 17, 1941     7 Sheets-Sheet 1

INVENTORS
DANIEL BELCHER
STANLEY C. FREEMAN
By Paul, Paul & Moore
ATTORNEYS

Dec. 13, 1949     D. BELCHER ET AL     2,491,027
APPARATUS FOR PREPARING PRINTING PLATES
Original Filed Oct. 17, 1941     7 Sheets-Sheet 3
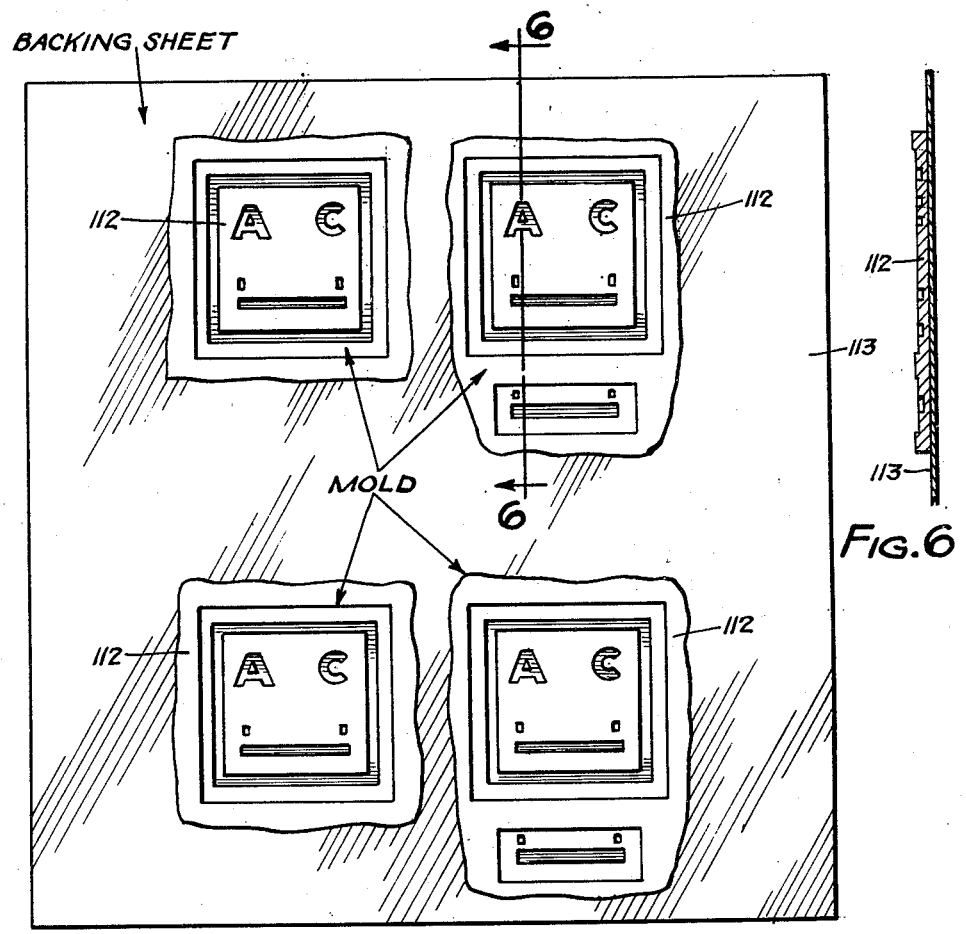
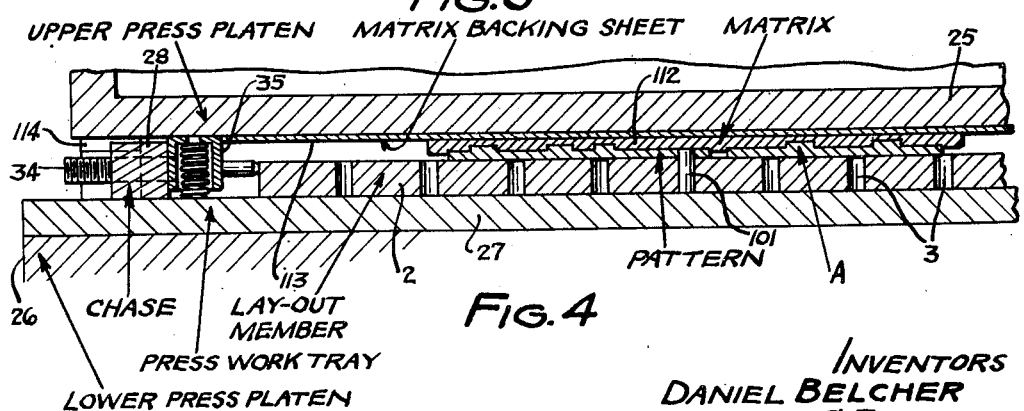
INVENTORS
DANIEL BELCHER
STANLEY C. FREEMAN
ATTORNEYS

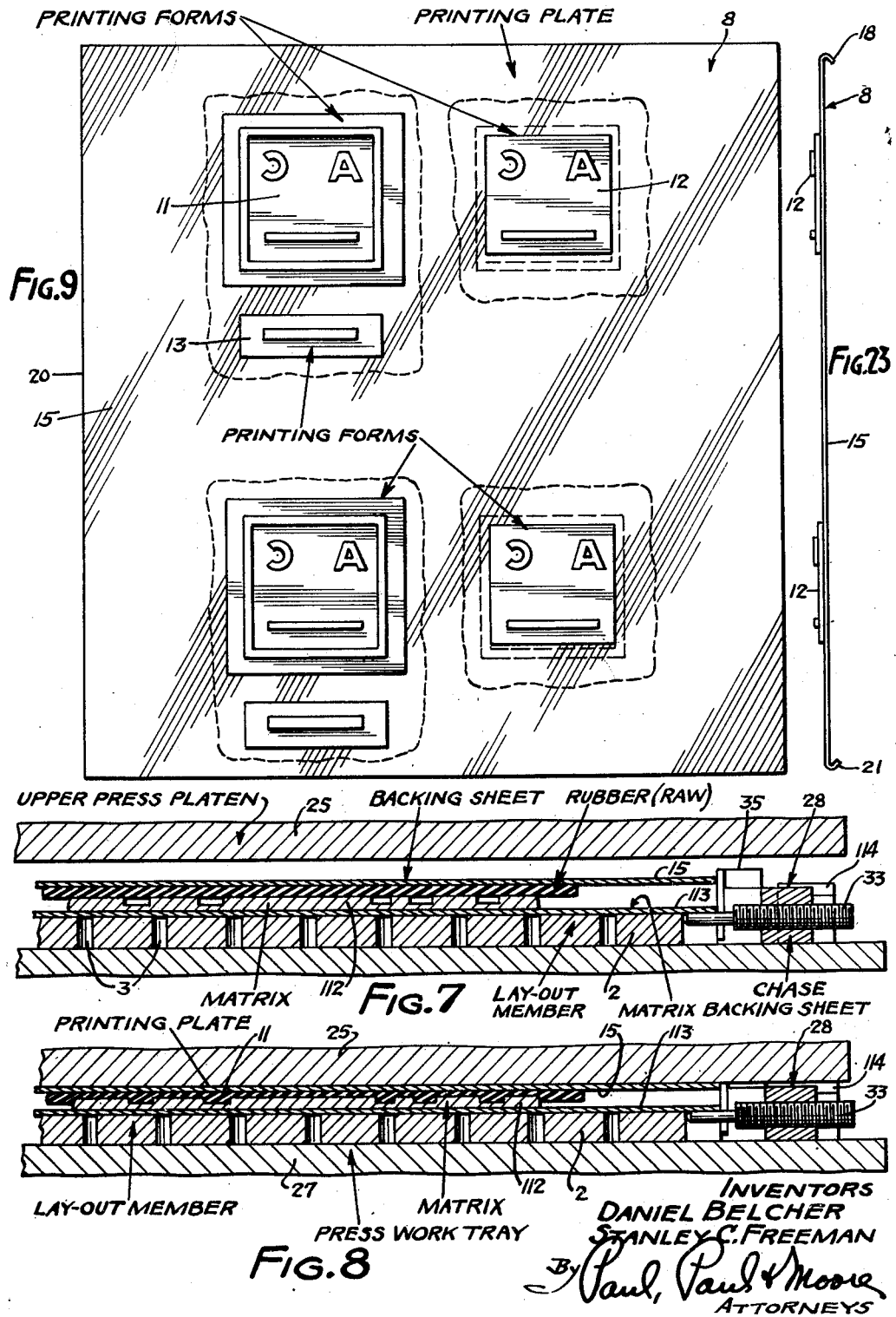

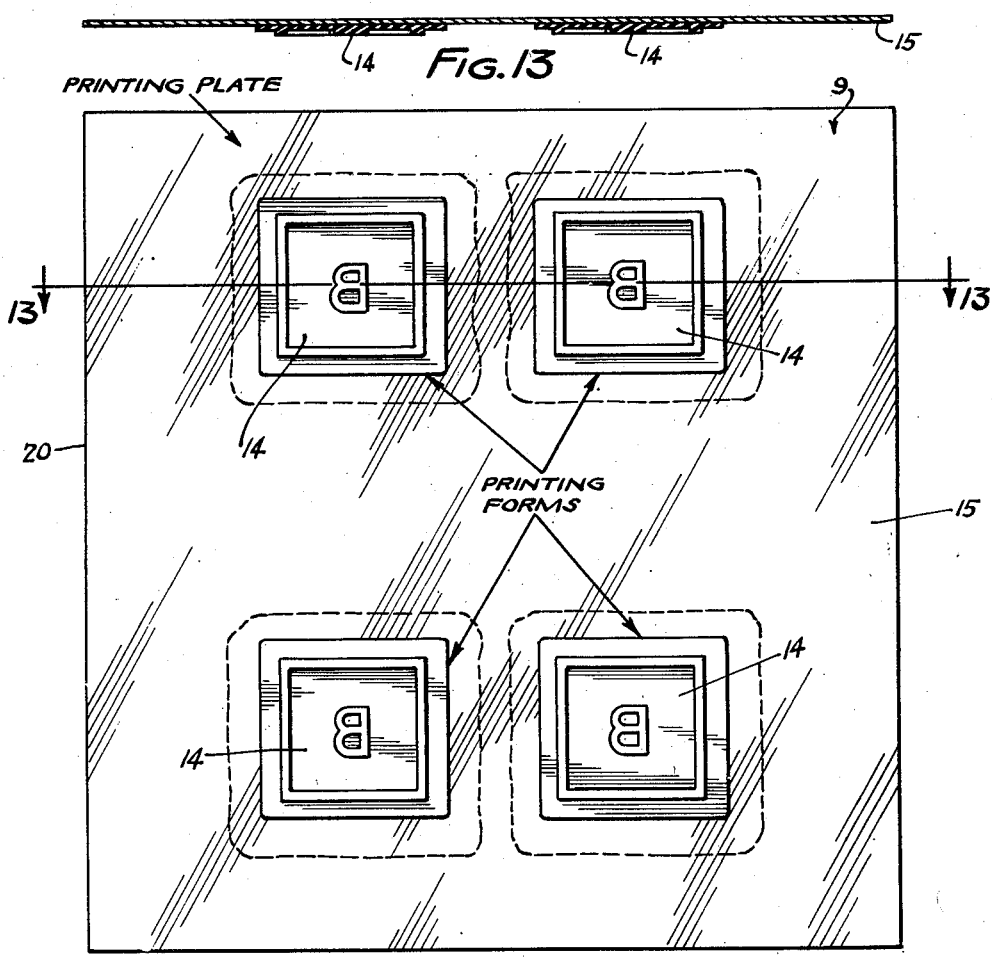
Fig. 13
Fig. 12
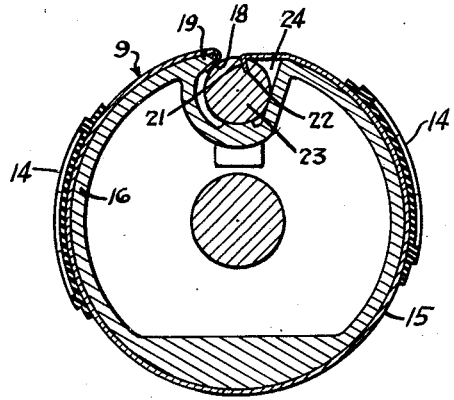
Fig. 14
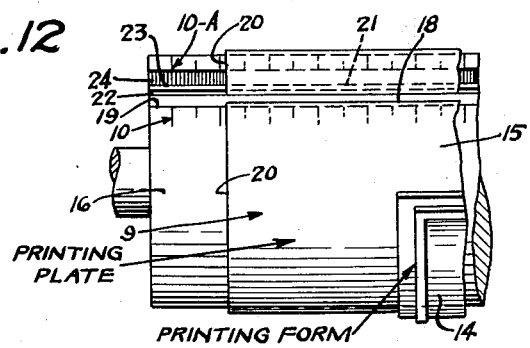
Fig. 24
INVENTORS
DANIEL BELCHER
STANLEY C. FREEMAN
By Paul, Paul + Moore
ATTORNEYS

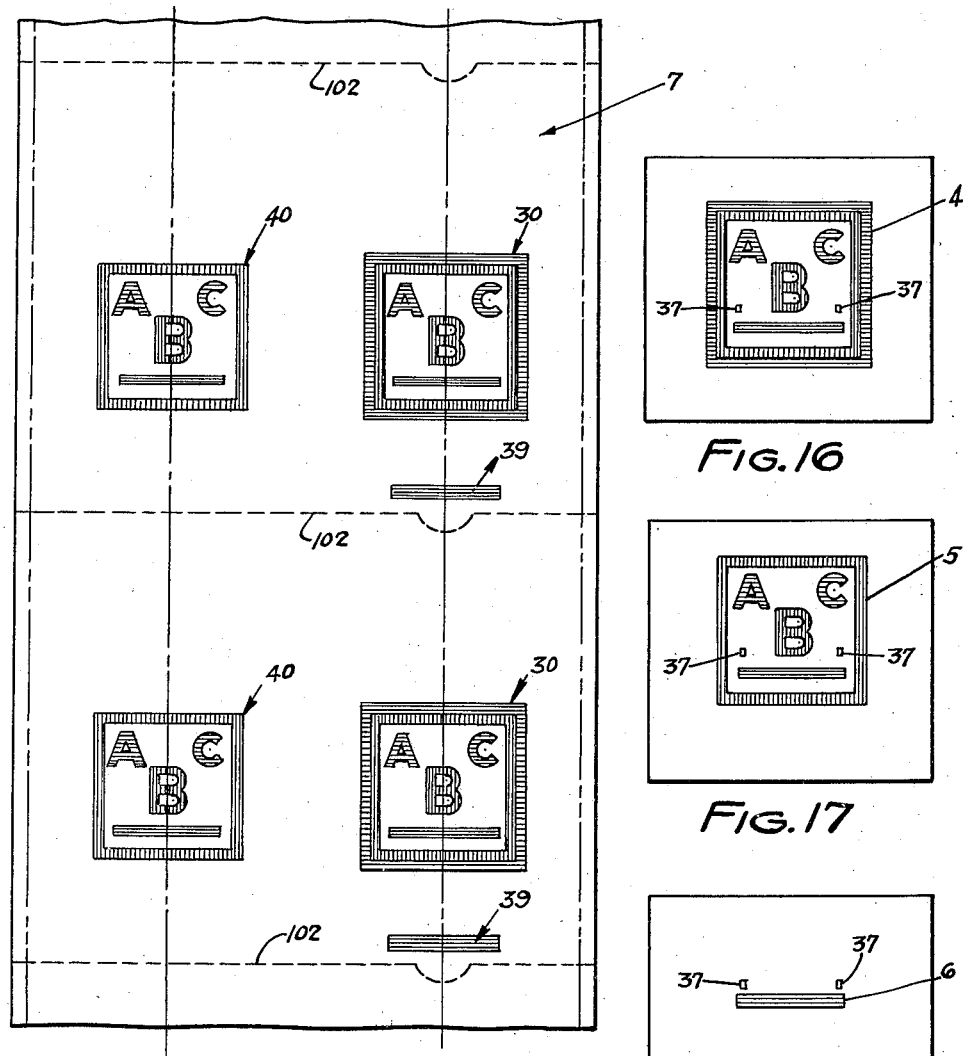

Dec. 13, 1949 D. BELCHER ET AL 2,491,027
APPARATUS FOR PREPARING PRINTING PLATES
Original Filed Oct. 17, 1941 7 Sheets-Sheet 7
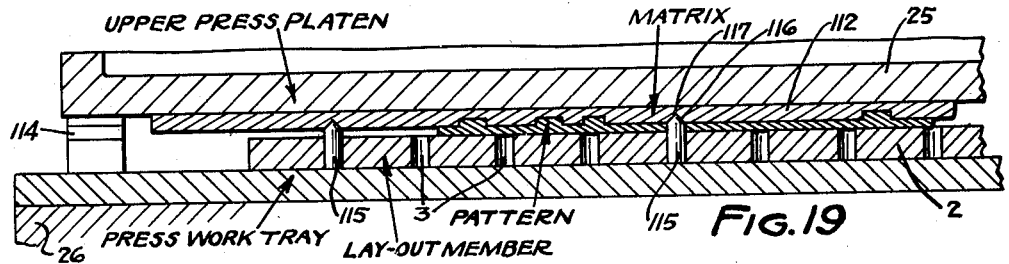
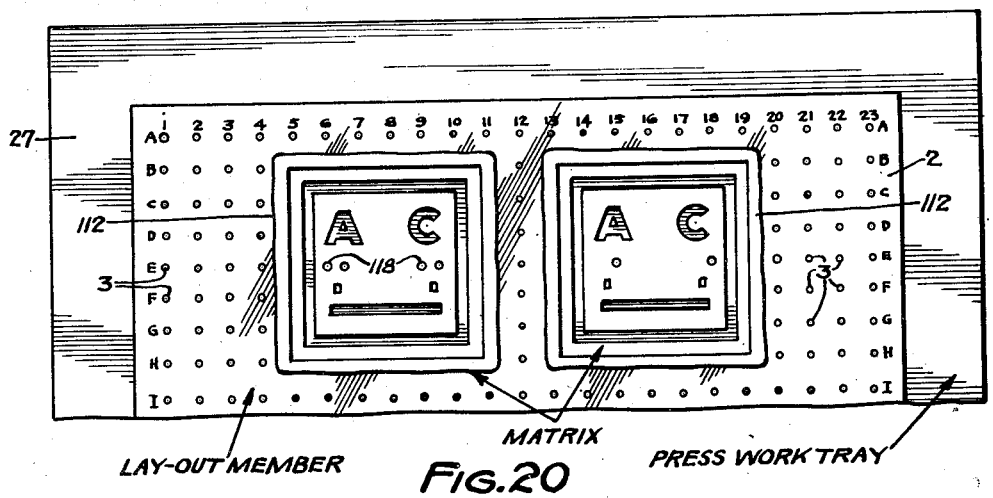
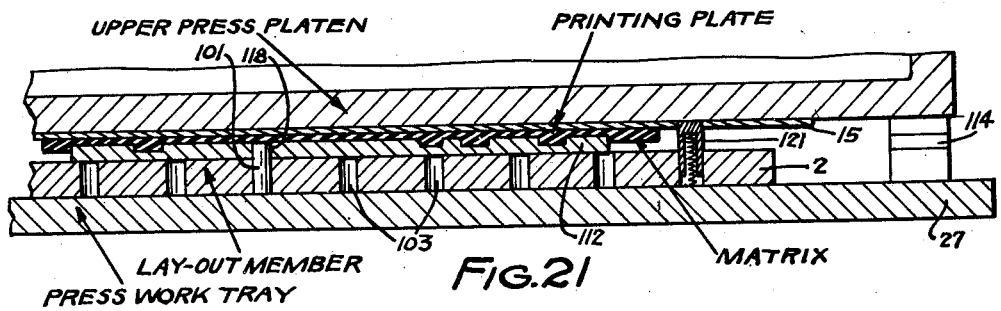
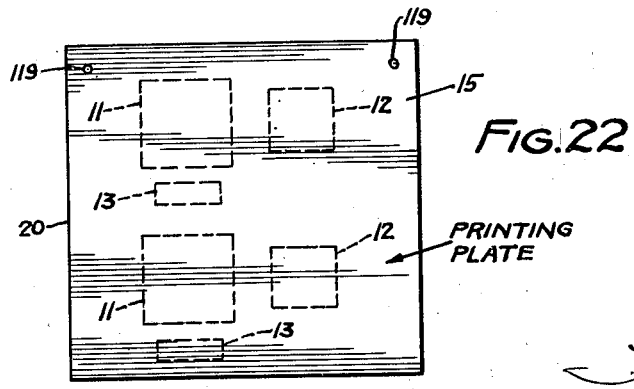
INVENTORS
DANIEL BELCHER
STANLEY C. FREEMAN
By Paul, Paul & Moore
ATTORNEYS Patented Dec. 13, 1949

2,491,027

UNITED STATES PATENT OFFICE 2,491,027

APPARATUS FOR PREPARING PRINTING PLATES

Daniel Belcher and Stanley C. Freeman, Minneapolis, Minn., assignors to Bemis Bro. Bag Company, Minneapolis, Minn., a corporation of Missouri Original application October 17, 1941, Serial No. 415,390. Divided and this application June 22, 1945, Serial No. 600,874

1 Claim. (Cl. 101—401.1)

This invention relates to new and useful improvements in apparatus for preparing printing plates, and more particularly to such plates adapted for use on rotary presses, although it is to be understood that printing plates for other types of presses may also be made in accordance with the invention.

In the manufacture of bags, it is usually customary to apply printed matter to one or more walls of each bag, designating the brand of the bag contents and the name of the distributor, etc. The printed matter designating the brand, etc., may be made up of several component parts.

Heretofore it has been customary to make the printing plates in the form of curved cast individual molds which are subsequently suitably secured to the cylinders. This method often requires a large number of printing plates, all of which must be secured squarely on the cylinder and in the proper spaced relationship to one another. This often requires a large amount of painstaking work on the part of the pressman, both in respect to the relation of the plates of a given color to one another, and also in respect to the registering up of the plates of different colors which may occupy separate cylinders, and obviously must be accurately located with respect to the plates of the key color. To thus accurately mount two or more printing plates on one or more cylinders, may require considerable time, as all such plates must be accurately positioned on the cylinder with respect to one another to assure proper registering of the printed matter on the work, particularly if the completed printed impression is composed of two or more colors. When the printed matter thus comprises more than one color, a separate printing plate or plates must be provided for each color, and said plates are then mounted on different cylinders of the printing press. When two or more printing cylinders are required to complete the formation of each impression, it will readily be understood that the printing plates on the various cylinders must be accurately located thereon whereby the various colors and other printed matter applied to the work will be in registration.

The present invention is directed more particularly to the formation of a flexible printing plate which may be made in the form of a relatively thin flexible member capable of being readily wrapped around the periphery of a printing cylinder and quickly secured thereto with a minimum of adjustments.

An important object of the present invention therefore is to provide a readily bendable printing plate comprising a thin, flexible backing sheet of suitable sheet material, having one or more printing forms suitably secured thereto, and which printing plate may readily be wrapped about a cylinder and secured thereto in a minimum of time.

A further object is to provide an apparatus for making relatively thin, flexible, relief printing plates, each of which may contain one or more printing forms, all of which may be necessary in the operation of printing a single bag or other piece of work; or a plurality of sets of forms may be arranged on the printing plate in a direction lengthwise of the cylinder, when the plate is mounted thereon, whereby two separate impressions may be applied to the work in spaced relation as, for example, to the front and back walls of a bag; or the printing forms may be arranged in tandem or in a direction circumferentially of the cylinder, when the printing plate is mounted thereon, whereby two similar, or duplicate impressions may be made on a web of material fed through the printing press for each revolution of the printing cylinder.

A further object is to provide a printing plate comprising a flexible supporting member of sheet material having a plurality of printing forms suitably secured thereto in accurately spaced relation, and said member having means whereby it may be quickly and accurately secured to the periphery of a printing cylinder with a minimum of adjustments.

A further object is to provide a printing plate having a plurality of sets of printing forms thereon, which sets may be duplicates of one another, whereby two complete impressions may be made for each revolution of the cylinder, resulting in the printing of two or more bag bodies for each revolution thereof.

A further object is to provide a printing plate having a plurality of printing forms secured thereto in a predetermined relation to one another, and the printing forms of each printing plate being so located with respect to certain edges of their respective printing plates, or to permanent marks thereon, that when a plurality of printing plates are subsequently secured to two or more cylinders of a printing press in a predetermined relation thereto, the related printing forms of said printing plates will cooperate to produce a completed impression in which the various characters or colors of said forms will be in substantially perfect register in the completed impression.

A further object is to provide an apparatus for making printing plates comprising a layout member or frame having substantially its entire surface perforated with holes of a given size, which roles are spaced equidistant apart in right-angular relation, preferably in even inches, whereby the pattern or patterns from which the matrix or matrices are subsequently to be made, may be quickly located on the layout member in accurately spaced relation.

A further object is to provide a layout member having a plurality of holes drilled therethrough in accurately spaced relation adapted to receive suitable anchor pins for anchoring one or more patterns thereto in accurately spaced relation, and a suitable matrix being made from each pattern while said patterns are supported on the layout frame or member, said matrix having spaced apertures therein adapted to register with selected apertures in the layout member, thereby to accurately position the matrix on the layout member in an upwardly facing direction, to facilitate completing the formation of the printing plate.

A further object is to provide a layout member having substantially its entire surface perforated with holes of a given size, and whereby one or more patterns may be secured to the layout member in accurately spaced relation with respect to the marginal edges of said member, and with respect to one another; said patterns being drilled to receive suitable anchoring pins which also are receivable in predetermined apertures in the layout member, and whereby a single matrix, or a plurality of matrices, may be made on the layout member in a single operation without the use of a backing sheet.

A further object is to provide means whereby a thin, flexible printing plate may be made from a plurality of separate matrices, having means for supporting them in accurately spaced relation during the formation of the printing plate therefrom.

Other objects of the invention reside in the provision of means for supporting the backing sheets of the matrix and printing plate in accurate registration with one another, during the operation of vulcanizing or otherwise securing the printing forms to the backing sheet of the printing plate, and whereby a plurality of forms may be quickly secured to the printing plate backing sheet in accurately spaced relation; in the provision of a chase having means for accurately locating a layout member or frame therein, upon which the patterns are subsequently secured in accurately spaced relation during formation of the matrix, said chase also having means for supporting the backing sheet of the matrix in adjustable registration with the layout member or frame, whereby the mold portions of the matrix, which may be of "Bakelite," or any other material suitable for the purpose, may be accurately located on the backing sheet of the matrix, either all at once or by successive operations; in the formation of a matrix by the application of heat and pressure thereto in a conventional press; in the provision of means for making a plurality of printing plates for a given multi-color job, whereby the printing forms provided on the various printing plates required for said job are located in a definite relation to one or more edges of each printing plate, whereby when the printing plates are subsequently secured to their erspective cylinders, the characters of the printing forms of the different printing plates which must be combined in the completed impression, will be substantially in perfect register, thereby greatly facilitating the operation of accurately mounting the printing plates upon their respective cylinders; and, in the provision of a simple apparatus for quickly performing all of the operations necessary in the formation of a printing plate, including the accurate locating of the patterns upon a suitable layout member or frame, the formation of a matrix from the patterns, and finally the formation of the printing plate from the matrix.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claim which follows.

In the drawings:

Figure 4 is a view similar to Figure 2, but showing the upper press platen in its lowered position to force the material used in the formation of the matrix into intimate contact with the pattern, thereby to form the matrix;

Figure 5 is a plan view of a completed matrix, showing the backing sheet with the molds secured thereto;

Figure 6 is detail sectional view on the line 6—6 of Figure 5;

Figure 7 is a detail sectional view showing the initial step in the operation of forming the printing plate from the matrix;

Figure 8 is a view similar to Figure 7, but showing the rubber mat or other plastic material used in the formation of the printing form, pressed into intimate contact with the matrix thereby to complete the formation of one of the printing forms of the printing plate;

Figure 9 is a plan view of a printing plate comprising a plurality of sets of printing forms;

Figure 12 is a plan view of the completed printing plate to be used in conjunction with the printing plate shown in Figure 9;

Figure 13 is a detail sectional view on the line 13—13 of Figure 12;

Figure 14 is a cross-sectional view of a printing cylinder, showing the manner of securing a printing plate thereto;

Figure 15 is a view showing a portion of a web of paper after having been printed with the printing plates shown in Figures 9 and 12;

Figures 16, 17 and 18 illustrate the different pieces of work required to make the different patterns necessary in the development of the printing plates shown in Figures 9 and 12, suitable register marks being shown on the art work to facilitate locating the patterns on the layout member;

Figure 19 is a view showing a matrix formed without a backing sheet, and pins supported in the layout member adapted to make drill guide marks or recesses in the matrix;

Figure 20 is a plan view of a portion of the layout member with a plurality of separate matrices of the type shown in Figure 19 supported thereon;

Figure 21 is a detail sectional view showing the rubber mat used in the formation of the printing plate pressed into intimate contact with a matrix supported directly on the layout member, as shown in Figure 20;

Figure 22 is a plan view of a printing plate, on a smaller scale, showing the backing sheet provided with spaced apertures adapted to register with predetermined holes in the layout member, and whereby said printing plates may be accurately supported on the layout member by inserting anchor pins through alined apertures in the printing plate and layout member;

Figure 23 is an end view of a completed printing plate showing the securing flanges provided at opposed edges thereof; and Figure 24 is an exterior view showing one end portion of the cylinder illustrated in Figure 14, showing the printing plate locating marks provided thereon.

Figure 1:
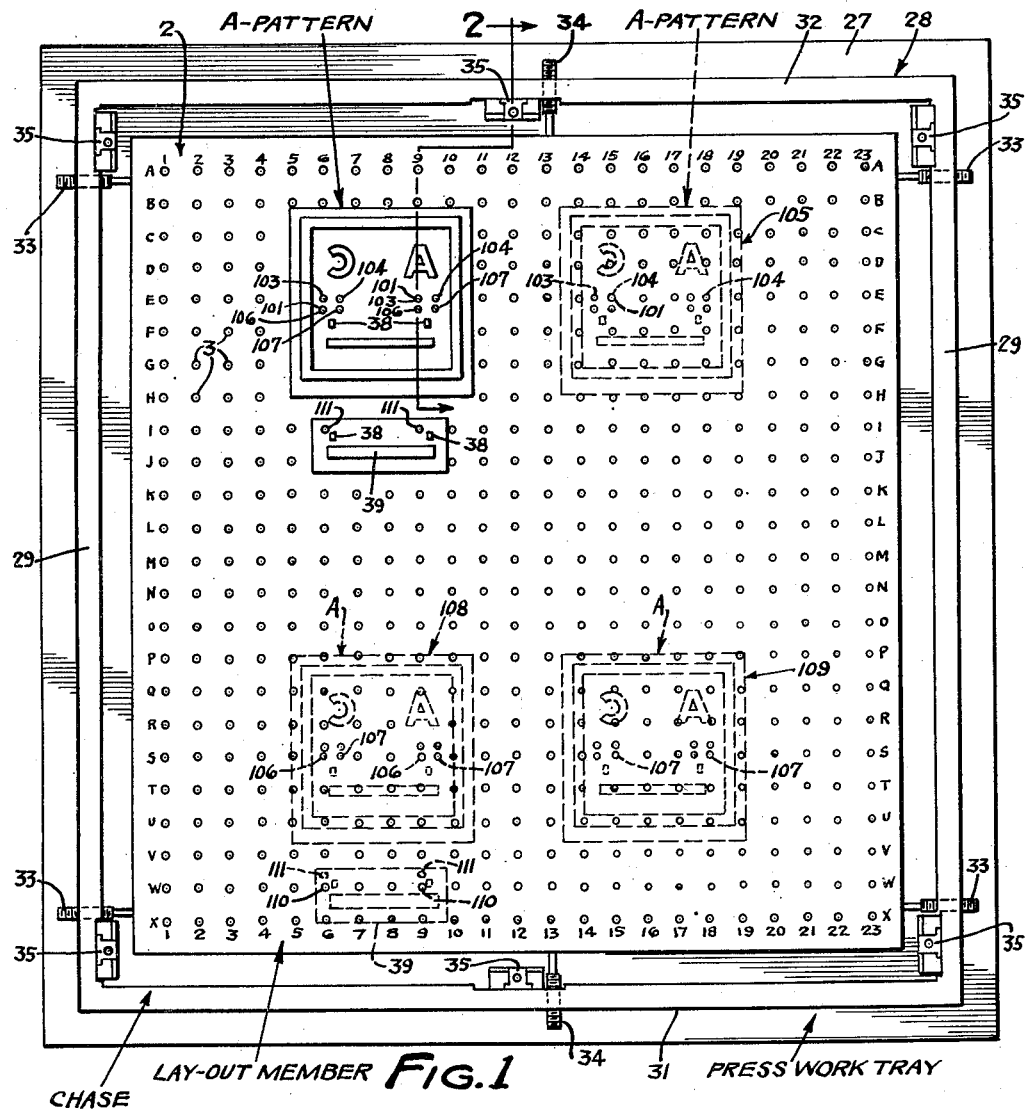
Figure 1 is a plan view of a chase showing our novel layout member or frame positioned therein, and also showing in full and dotted lines the manner of positioning a plurality of patterns on the layout member in accurately spaced relation.
Figure 2:
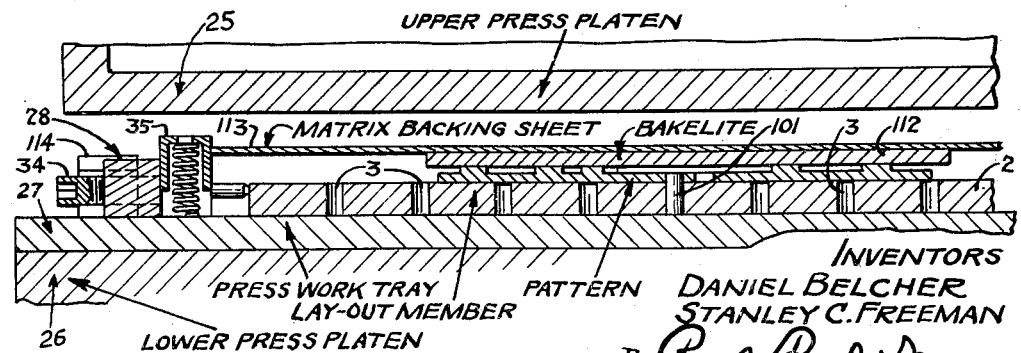
Figure 2 is a detail sectional view on the line 2—2 of Figure 1, on a larger scale, showing the means for anchoring the pattern to the layout member and also showing the first step in the formation of the matrix.

One of the important features of the present invention resides in the provision of a suitable layout member, generally designated by the numeral 2, and best shown in Figures 1 and 2. This layout member provides the foundation for carrying out the various operations required in the preparation of printing plates in accordance with the invention herein disclosed. The entire surface of the layout member 2 is preferably perforated with holes 3 which are uniformly spaced apart in right-angular relation, as clearly illustrated in Figure 1. The holes are all uniform in size, and, for convenience, are preferably spaced one inch apart in both directions. By arranging the holes 3 in right-angular relation, they provide vertical rows of holes, numbered 1 to 23, and horizontally disposed rows of holes identified by the reference letters A to X, inclusive, when the layout member is viewed as shown in Figure 1. The size of the layout member 2 is preferably equal to or larger than the largest sized printing plate to be made.

In the process of making printing plates of the relief type, as herein disclosed, patterns of conventional design are utilized for making the necessary matrices from which the printing forms are subsequently made. The patterns are made in the usual manner from art work, such as shown at 4, 5 and 6, in Figures 16 to 18, inclusive, and may be in the form of zinc etchings, engravings, electrotypes, or what is commonly known to the trade as type lockup.

In the manufacture of bags, the bag blanks are cut from a web of stock, generally designated by the numeral 7, in Figure 15, which web, after being printed, is folded to provide a tube, which is subsequently made into bags by suitable apparatus, not shown.

Before the tube is folded, the printed matter, designating the brand of the contents of the bag and the name of the distributor, is applied to the web 7 as shown in Figure 15. When, as in the present case, the printed matter is made up of two or more colors, a plurality of printing plates must be utilized, one or more for each color. The printed matter is applied to the web usually by passing the web through a printing press, preferably of the rotary type, although it is to be understood that the printing may also be accomplished by other types of presses without departing from the scope of the invention.

To thus print the blanks, two or more printing plates, generally designated by the numerals 8 and 9, in Figures 9 and 12, respectively, are utilized. As here shown, the printing plate 8 is provided with the usual printing forms 11, 12 and 13, and the plate 9 may be provided with a plurality of similar printing forms 14, as shown in Figure 12. The printing plate 8, shown in Figure 9, prints the characters provided by the printing forms 11, 12 and 13, directly on the web, and the printing forms 14 on printing plate 9 make impressions on the web in accurate registry with the impressions made by the printing forms shown on printing plate 8. Throughout the specification and appended claims, the term "impressions" is utilized to designate the characters, lettering, etc., which is printed upon the work by the printing forms of the printing plates, two or more such impressions frequently being necessary to produce a complete impression.

The formation of the printing plates 8 and 9 herein disclosed, constitutes an important feature of the present invention. Each comprises a backing sheet 15, which may be made from any suitable sheet material applicable for the purpose, as, for example, sheet metal, which is sufficiently flexible to permit it to be readily wound or wrapped about the periphery of a printing cylinder, as shown in Figure 14. To secure a printing plate to a printing cylinder, one edge of each printing plate is provided with a hook-like flange 18, adapted to engage the edge portion 19 of the printing cylinder 16, as shown in Figure 14. The edge portion 19 of the cylinder is parallel to the axis of the cylinder, and the flange 18 formed on the printing plate is disposed at right-angles to at least one side edge of the printing plate, as, for example, the edge 20, as shown in Figures 9 and 12. The opposite marginal edge of each backing sheet 15 is provided with a flange 21, which flange is adapted to be received in a longitudinally extending slot 22 provided in the periphery of a suitable roller 23, shown mounted in a longitudinal recess 24 provided in the periphery of the cylinder 16. Means, not shown, is provided for relatively rotating the roller 23, whereby the printing plate engaged therewith may be drawn tightly around the periphery of the cylinder and secured in operative position thereon.

It is to be understood that the printing forms provided on the printing plates 8 and 9 are located in a definite or predetermined relation to the upper edges of said plates, when viewed as shown in Figures 9 and 12, and they are also located a predetermined distance from the edges 20 of their respective printing plates. When the printing forms are thus located upon their respective printing plates, they will be squared with respect to the upper edges or flanges 18 of the printing plates and with respect to the side edges 20 thereof.

The cylinders 16 are preferably so mounted in the printing press that they may be adjusted both axially and rotatively with respect to one another, whereby the printing plate supporting edges 19 of the various cylinders of a given press may be accurately positioned with respect to one another, whereby the printing forms of the various printing plates supported thereon will register on the work. It is to be understood that when the printing press is operated, all of the cylinders are operated in timed relation. Each cylinder is preferably provided with one or more printing plate locating marks, as shown at 10, in Figure 24, for locating the leading end of the printing plate with respect to the adjacent end of the cylinder, it being assumed that the leading end comprises the flange 18. These locating marks are disposed adjacent to the securing edge portion 19 of each cylinder, and may extend the full length of the cylinder, if desired. Similar marks 10—A may be provided on the cylinder at the opposite side of the recess 24 to facilitate alining the trailing end of the printing plate with the leading end, as will readily be understood by reference to Figure 24. The marks 10—A are circumferentially alined with the marks 10.

It will thus be seen that when the printing forms are squared with respect to the flanged edge 18 and side edge 20 of the printing plate, the operation of accurately locating the various printing plates on their respective cylinders and securing them thereto is greatly facilitated. By reference to Figure 24, it will readily be understood how simple it is to mount a printing plate upon a cylinder in squared relation thereto. In actual operation we have found that by constructing the printing plates as above described, once the cylinders have been accurately adjusted with respect to one another, the printing plates may be applied thereto with a minimum of effort and time, and with the assurance that the various characters or colors of the different printing plates required in the formation of a completed impression, will be in register on the completed impression.

In Figure 2 there is shown a portion of a conventional vulcanizing press comprising the usual upper and lower platens 25 and 26, respectively. A flat plate 27, which will hereafter be referred to as the press work tray, is supported on the lower press platen 26, and upon this tray the layout member 2 is preferably supported during formation of the matrix and printing plates.

In the form shown in Figures 1 and 2, the layout member is supported in a chase, generally designated by the numeral 28, which constitutes, in effect, a shallow rectangular frame, comprising opposed side walls 29—29 and front and rear walls 31 and 32, respectively. Suitable adjusting screws 33 are provided in the sidewalls 29 of the chase, and similar adjusting screws 34 are provided in the front and rear walls 31 and 32, as clearly illustrated in Figure 1. The adjusting screws 33 and 34 function to accurately position the layout member 2 in the chase, and to maintain it in such position therein, it being understood that the chase in turn is supported on the tray 27, as clearly illustrated in Figure 2.

The adjusting screws 33 and 34 may also be utilized to vary the relationship between the layout member 2 and the chase, thereby to vary the relationship between a pattern secured to the layout member and the edge of the backing sheet to which the mold is to be secured, thus providing means for varying the distance between molds without requiring the drilling of additional holes in the pattern.

The chase is shown provided with a plurality of spring-pressed guides 35, preferably located as shown in Figure 1, which guides cooperate to support the backing sheets 15 and 113 of the printing plate and matrix, respectively, in proper position within the chase and with respect to the layout member 2, as best shown in Figures 7 and 8.

Before the operation of making a printing plate can be started, it is necessary that one or more patterns be made from the original art work, such as shown in Figures 16, 17 and 18. The number of patterns required to complete the formation of a specific printed impression is dependent upon the number of colors required in the construction thereof, each color requiring a separate printing form and therefore usually a separate pattern. In other words, if the finished impression is composed of a single color, one pattern may suffice. If two or more colors are required to complete the formation of a single impression, one pattern is usually required for each color.

To afford a clearer explanation of the present invention, we have shown in Figure 15, completed impressions, generally designated by the numerals 30 and 40, each comprising two colors, as, for example, red and blue, whereby two printing plates are required to complete each impression. If a butt print 30a is to be applied to the resultant bag, as in the present case, a third pattern may be required.

Figure 10:
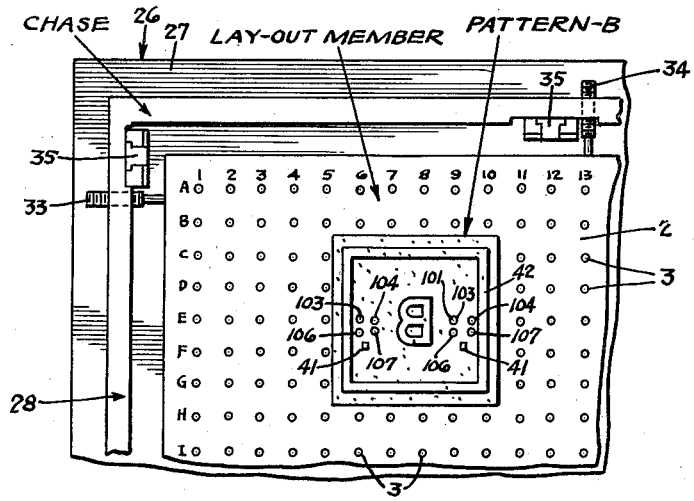
Figure 10 is a detail plan view of portions of the chase and layout member, showing another pattern positioned on the layout member whereby it will register with the pattern shown in Figure 1.
Figure 11:
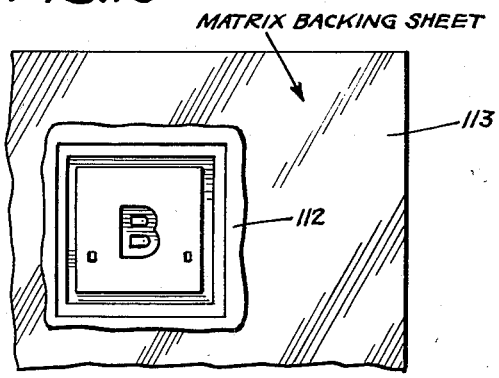
Figure 11 is a plan view of the matrix made from the B pattern shown in Figure 10.
Figure 3:
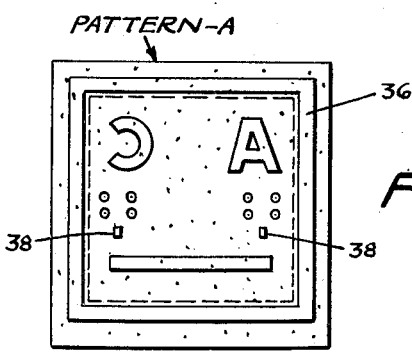
Figure 3 is a plan view of a pattern showing the drilled holes therein.

Thus, in the present instance, three separate patterns are required, one being made up as shown in Figure 3, which will hereinafter be referred to as the A pattern, another one as shown in Figure 10, which will be referred to as the B pattern, and a third pattern, such as shown in Figure 1, which will be referred to as the butt pattern 39.

In a two-color job as herein disclosed, the A and butt patterns, including the raised border 36 of pattern A, will be considered as making a blue impression on the finished work, and the printing plate made from the B pattern, a red impression. Because of two colors thus being used in the formation of the finished impression, the printing plates made from the A and B patterns must be mounted on separate cylinders in the printing press, and must be accurately located thereon so that the two impressions made from the printing plates will be in perfect registry on the finished work, as shown in Figure 15.

The patterns, as hereinbefore stated, are made in the usual manner from the art work 4, 5 and 6, and to make the printing plates in accordance with the method herein disclosed, the patterns must have holes drilled therein to receive anchoring pins for maintaining the patterns in accurately spaced relation on the layout member 2, as shown in Figures 1 and 10.

Suitable register marks 37 or other guide means are therefore provided on the original art work, as shown in Figures 16, 17 and 18. These register marks are located in a definite relation to the characters or symbols of the art work, and when the patterns are made from the art work, similar register marks 38, preferably in relief, are provided on the patterns, as clearly illustrated in Figure 3. The register marks 38 of the A, B and butt patterns, are located in definite relations to the characters of said patterns, and are utilized to facilitate drilling the patterns whereby they may be accurately located and maintained on the layout member.

Suitable means, not shown, is utilized for accurately drilling the patterns to facilitate locating them on the layout member 2 and maintaining them in proper position thereon.

When the printed impression to be applied to the bag or other work is composed of two colors, as shown, for example, in Figure 15, two separate printing plates are required, one for the blue color and one for the red. To make up the printing plates, and particularly when a bag or work requires a "butt" print, three patterns are required, an A pattern, as shown in Figure 1, a B pattern, as shown in Figure 10, and a butt pattern 39, as shown in Figure 1. These patterns, after having been accurately drilled in accordance with the required locations of the printed matter on the bag, are placed upon the layout member 2 in spaced relation, such spacing being determined by the spacing of the printed matter to be applied to the bag web. After the patterns have been drilled, they are placed on the layout member 2 in accurately spaced relation, and suitable anchor pins 101 are inserted through the drilled apertures in the patterns and into alined apertures or holes in the layout member 2, whereby the patterns are retained in fixed relation with respect to one another.

In the operation of making a printing plate from the A and butt patterns, as shown, for example, in Figure 9, the operator must first determine the exact spacing between the printed impressions to be made on the front and back walls of the bag body, it being understood that the printing may be applied to the tube blank before completing the formation of the bag, as shown in Figure 15. In this figure, the broken lines 102 indicate transverse cutting lines where the tube is subsequently divided into sections, each section constituting a bag blank.

In the present instance, let it be assumed the spacing between the completed printed impressions 30 and 40, shown in Figure 15, is 8½ inches, and that the spacing between each pair of impressions 30 and 40 in a direction lengthwise of the tube blank, is 13¾ inches. When these figures have been determined, the operator may proceed with the operation of locating the anchor holes to be drilled in the patterns for maintaining the patterns in accurately spaced relation upon the layout member 2. The anchor holes in the patterns are located in a definite relation to the register marks 38 on the patterns. Each pattern has two anchor holes drilled therein which are spaced as far apart as possible to provide an adequate support for the pattern. These anchor holes must be so drilled in the patterns that they do not mar or damage the relief portions thereof, as shown, for example, in Figure 1.

When the impressions 30 and 40 on a tube blank are not spaced even inches apart, as in the present instance, two or more sets of holes may be required in each pattern, assuming, of course, that the same pattern is used in the operation of making the molds of the matrix, from which the printing forms of the printing plate are subsequently to be made. By reference to Figure 1, it will be noted that two anchor holes 103 have been drilled in the A pattern, each spaced to the left of its respective register mark 38. The anchor holes 103 are also shown located between the register marks and the letters or characters A—C. The spacing between the two holes 103 must be in even inches so that they will register with two of the holes 3 in the layout member. In other words, as shown in Figure 1, the holes 103 in the A pattern are spaced three inches apart, and are shown registering with the E—6 and E—9 holes in the layout member, whereby anchor pins 101 may be inserted through said alined holes to maintain the pattern on the layout member, in the full line position shown in Figure 1, it being understood that the holes 3 in the layout member are all spaced one inch apart in right-angular relation, as hereinbefore stated.

When the spacing between the impressions 30 and 40 is in fractions of an inch as, for example, 8½ inches as here shown, a second set of anchor holes 104 are drilled in the A pattern, which are horizontally alined with the anchor holes 103, when viewed as shown in Figure 1. In the present instance, the holes 104 are shown spaced one-half inch to the right of their complemental anchor holes 103, and are used for supporting the pattern on the layout member in the dotted line position shown at 105 in Figure 1. When the pattern is thus positioned, the anchor holes 104 will be alined with the E—15 and E—18 holes in the layout member, whereby anchor pins 101 may be inserted through said alined holes, thereby to maintain the pattern in the dotted line position shown at the upper right hand corner of Figure 1. Obviously, the spacing between the holes 103 and 104 is a variable factor, and is dependent, to a large extent, upon the spacing required between the patterns shown in full and dotted lines in the upper portion of Figure 1.

Thus when two sets of holes 103 and 104 are provided in the A pattern, as above described, and the pattern is secured in position on the layout member 2, first as shown in full lines in Figure 1, and then shifting it to the right for the formation of the next mold portion of the matrix, the spacing between the two pattern positions shown in the upper portion of Figure 1, will be 8½ inches, corresponding to the spacing between the impressions 30 and 40, shown in Figure 15.

In a like manner, when the spacing between adjacent pairs of impressions 30 and 40 is in fractions of an inch, it may become necessary to drill additional holes 106 and 107 in the pattern in order to successively accurately locate it on the layout member 2 in the positions indicated at 108 and 109 in the lower portion of Figure 1.

It will thus be seen that when the spacing between the required printed impressions is not in even inches, it may be necessary to drill two or more sets of holes in each pattern in order to accurately locate the pattern on the layout member in the various positions required to make up a composite matrix of the type shown in Figure 5. The butt pattern 39 is shown provided with suitable anchor holes 111, which are so located on the butt pattern that, when said pattern is anchored to the layout member by a pair of anchor pins 101, the butt pattern will be in the proper relation to the A pattern, as shown in full lines in Figure 1. When the A and butt patterns are shifted to the position shown at 108 in Figure 1, additional holes 110 are drilled in the butt pattern 39, as indicated by the dotted lines in Figure 1. The spacing between the holes 111 and 110 in the butt pattern 39 corresponds to the spacing between the holes 103 and 106 in the A pattern.

The above described method of locating the patterns on the layout member is followed when the completed printing plate shown in Figure 9 is to be provided with a plurality of sets of printing forms 11, 12 and 13, which, it will be noted, renders it capable of printing two complete bag blanks for each revolution of the printing cylinder. If the printing forms 11, 12 and 13 were made on independent printing plates, as is now more or less common practice, it might not be necessary to drill the patterns, as hereinbefore described.

When making a matrix or printing plate in accordance with the invention, as above described, it is to be understood that the backing sheets of the matrix and printing plate are supported in accurate register on the layout member 2 by means of the guides 35. In other words, the backing sheets are maintained in fixed relation to the layout member by these guides, the layout member being supported in fixed relation to the guides by means of the screws 33 and 34. When making a matrix, and the backing sheet thereof is thus supported in the chase, it is possible at times to dispense with the drilling of the holes 104 and 107 in the pattern, by relatively shifting the position of the layout member with respect to the backing sheet by manipulation of the screws 33 and 34.

To produce the printing plate shown in Figure 9, it is necessary that a matrix be made from the patterns, as is customary in the printing art. In the operation of making the matrix from which the printing plate 8 is subsequently to be made, the operator, after having placed the A and butt patterns on the layout member, as shown in full lines in Figure 1, places a suitable matrix material such as "Bakelite," generally designated by the numeral 112, over the patterns, as shown, for example, in Figure 2. A thin backing sheet of a suitable material such as metal, which may have one face suitably treated to cause the "Bakelite" to adhere thereto under the influence of heat or pressure, or both heat and pressure, is then placed over the "Bakelite" 112, and is maintained in a predetermined relation to the pattern by means of the spring-pressed guides 35 provided in the chase, as will be understood by reference to Figure 2. When the upper and lower platens 25 and 26, respectively, of the press are brought together, the "Bakelite" is forced into intimate contact with the surface of the pattern so that the characters on the face of the pattern will be impressed in the adjacent face of the "Bakelite." It is to be understood that the platens 25 and 26 are suitably heated, whereby the "Bakelite" is heated to cause it to become sufficiently plastic to permit it to be readily pressed into the depressions in the face of the patterns, after which it is permanently secured to the backing sheet.

Suitable limit stops 114 limit the relative movement of the platens 25 and 26 towards one another, in the operation of pressing the "Bakelite" into the pattern. It will be noted by reference to Figure 2. that during the above described operation, the layout member 2 and the chase are supported on the press work tray 27, mounted on the lower press platen 26.

When the first molds have been made from the A and butt patterns, as shown in the upper right hand corner of Figure 5, the operator shifts the A pattern to the dotted line position 105, shown in the upper right hand portion of Figure 1, after which another piece of "Bakelite" is placed over the pattern and another mold formed on the same backing sheet 113. The operator then shifts the A and butt patterns to the position shown at 108 in Figure 1, and repeats the operation, and so on until the backing sheet 113 of the matrix will be supplied with a plurality of independent molds, such as shown in Figure 5. In this figure it will be noted the completed matrix is shown provided with two separate sets of molds, whereby two bag blanks are printed for each revolution of the printing cylinder.

When the matrix has been completed, as shown in Figure 5, it is placed on the layout member, as shown in Figure 7, with the molds facing upwardly. A suitable pad of raw or unvulcanized rubber is then laid on each mold of the matrix, as shown in Figure 7, after which a backing sheet 15 of the same size as the backing sheet 113 of the matrix is placed on top of the rubber pads. The backing sheet 115 is maintained in registry with the matrix by the spring-pressed guides provided in the chase. The upper and lower press platens 25 and 26 are then operated to force the raw or unvulcanized rubber pads into intimate contact with the face of the matrix, the heat from said platens causing the rubber to become sufficiently soft and plastic to permit it to be readily pressed into the depressions in the face of the matrix and also to be permanently secured to the backing sheet 115. After vulcanization is complete, the platens are separated, whereby the printing plate 8 will be ready to have its opposed edges bent to provide the securing flanges 18 and 21, shown in Figures 9 and 23. These flanges may be formed by any suitable bending apparatus, it being essential that they be square with the side edge 20 of the printing plate.

As previously stated, when the finished printed impression is composed of two or more colors, a similar number of printing plates are required to complete the finished impression. In the present instance, the finished printed impression is shown comprising two colors, the A and butt patterns representing blue, and the B pattern the red. When the operator has completed printing plate 8, as above described, he proceeds to prepare printing plate 9, comprising the printing forms 14, as shown in Figures 12 and 13. This printing plate is made in identically the same manner as printing plate 8, shown in Figure 9.

Printing plates made in accordance with the above described method may be made comparatively thin, whereby they may readily be secured to the periphery of a printing press cylinder, as shown in Figure 14, in a minimum of time, and without danger of noticeably distorting the characters thereon as a result of the curvature of the cylinder. The backing sheet of each printing plate, as hereinbefore stated, is provided, after vulcanization, with the opposed flanges 18 and 21, which are parallel to one another, and are disposed in a definite relation to the printing molds of the printing plate. The provision of the marginal flanges 18 and 21 on the printing plates 8 and 9, greatly facilitate the operations of securing the printing plates to the peripheries of their respective cylinders because of the hooked flanges 18 of the printing plates engaging the cylinder portions 19, whereby the printing plates are squared and circumferentially registered with their respective cylinders, which has heretofore required a great deal of painstaking care and time to accomplish as a result of the methods now in use.

In Figures 19 and 20, we have shown another method of making a printing plate, in which the various printing forms to be applied to the backing sheet of the printing plate are made from separate matrices, which are supported in accurately spaced relation upon the layout member 2 by anchor pins 191. The independent matrices thus utilized, are made from the A, B and butt patterns in a manner similar to the matrices shown in the previous figures. In Figure 19 a pattern is shown supported on the layout member 2 and maintained thereon by suitable anchor pins 115, preferably having pointed terminals 116, which project slightly above the pattern, whereby each may make a drill guide mark 117 in the face of the matrix, to facilitate subsequently drilling anchor holes 118 in the matrix, as shown in Figure 20.

In Figure 19 it will also be noted that each matrix is made from a pattern without the use of a backing sheet, and is marked for drilling by the anchor pins 115, whereby when the matrix is subsequently removed from the pattern, it may be inserted beneath the drill guide of the drill table and drilled, the drill guide marks 117 assuring the operator that the matrix will be accurately drilled. By thus making a plurality of matrices, said matrices may be mounted on the layout member in accurately spaced relation, as shown in Figure 20, whereby a composite printing plate may readily be made from a plurality of such separate matrices, as shown, for example, in Figure 21.

It will be noted in the form of the invention, as shown in Figures 19 and 22, the chase has been dispensed with, and in lieu thereof the backing sheet 15 of each printing plate is provided with spaced apertures 119, preferably drilled in accurate relation to the edges of the backing sheet. The apertures 119 are adapted to receive spring-pressed pins 121, supported in predetermined apertures in the layout member 2, whereby the backing sheet 15 cannot relatively change its position with respect to the layout member. By thus supporting the backing sheet of the printing plate, the operation of pressing the raw rubber pads into intimate contact with the faces of the various matrices supported on the layout member to form the printing molds of a given printing plate, is greatly simplified, and the operator is assured that the resultant printing molds will be accurately located on the backing sheet of the printing plate, as shown, for example, in Figure 22.

The matrices may be independently supported on the layout member 2 by anchor pins 101, as shown in Figure 21, or the matrix may comprise a backing sheet to which the various molds have been secured, as hereinbefore described. When such a full size matrix is employed, the backing sheet thereof will be drilled in a manner similar to the printing plate shown in Figure 22, whereby the backing sheets of the matrix and printing plate may be maintained in accurate registry on the layout member 2 by the insertion of anchor pins through the alined apertures 119 of the two backing sheets.

In the accompanying drawings, we have shown the printing plate comprising a thin sheet metal backing plate, to which the printing forms have been vulcanized or otherwise fixedly secured in accurately spaced relation. It is to be understood, however, that the invention may also be applied to other types of printing plates, as, for example, non-flexible printing plates. In the specification, we have also referred to the matrix and printing molds as being made of "Bakelite" and raw rubber, respectively, but it is to be understood that they may be made of other materials applicable for the purpose, without departing from the scope of the invention.

It will be apparent to those skilled in the art that we have accomplished at least the principal objects of our invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim as our invention:

In an apparatus for making printing plates, a layout member having the major portion of its surface perforated with holes of a given diameter, and all of said holes being uniformly spaced apart in right-angular relation, a matrix having a pair of spaced apertures therein adapted to register with predetermined holes in the layout member, suitable anchor pins fitted into the alined apertures of the matrix and said member to secure the matrix in proper position on the layout member, and a printing plate backing sheet supported over the matrix and having spaced apertures therein adapted to register with predetermined holes in the layout member for receiving anchor pins to guide the printing plate backing sheet into accurate registry with the matrix.

DANIEL BELCHER.
STANLEY C. FREEMAN.

REFERENCES CITED

The following references are of record in the file of this patent:

UNITED STATES PATENTS

| Number | Name | Date |
| --- | --- | --- |
| 1,281,632 | Mowbray | Oct. 15, 1918 |
| 1,296,929 | Dalziel | Mar. 11, 1919 |
| 1,377,513 | Novotny | May 10, 1921 |
| 1,459,669 | Berold | June 19, 1923 |
| 2,108,039 | Betts | Feb. 15, 1928 |
| 2,000,756 | Heck | May 7, 1935 |
| 2,131,323 | Huebner | Sept. 27, 1938 |
| 2,330,002 | Moss | Sept. 21, 1943 |
| 2,334,821 | Hawley | Nov. 23, 1943 |
| 2,348,944 | White | May 16, 1944 |
| 2,433,653 | Deye | Dec. 30, 1947 |